(12) United States Patent
Ueda et al.

(10) Patent No.: US 12,157,397 B2
(45) Date of Patent: Dec. 3, 2024

(54) VEHICLE BATTERY COOLING APPARATUS

(71) Applicant: SUBARU CORPORATION, Tokyo (JP)

(72) Inventors: Hatsuhisa Ueda, Tokyo (JP); Toshiaki Naruke, Tokyo (JP); Shinnosuke Izumi, Tokyo (JP); Hideki Tomiyama, Tokyo (JP); Ryo Inagaki, Tokyo (JP); Takeshi Kanbe, Tokyo (JP); Tatsuya Ishikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 337 days.

(21) Appl. No.: 17/487,936

(22) Filed: Sep. 28, 2021

(65) Prior Publication Data

US 2022/0111761 A1    Apr. 14, 2022

(30) Foreign Application Priority Data

Oct. 12, 2020    (JP) .................................. 2020-172074

(51) Int. Cl.
*B60L 58/26*    (2019.01)
*H01M 10/48*    (2006.01)
(Continued)

(52) U.S. Cl.
CPC ............ *B60L 58/26* (2019.02); *H01M 10/486* (2013.01); *H01M 10/613* (2015.04); *H01M 10/625* (2015.04); *H01M 10/63* (2015.04); *H01M 10/6568* (2015.04); *H01M 10/663* (2015.04); *H01M 2220/20* (2013.01)

(58) Field of Classification Search
CPC ... B60L 58/26; H01M 10/613; H01M 10/625; H01M 10/63; H01M 10/6568; H01M 10/663; H01M 10/486; H01M 2220/20
See application file for complete search history.

(56) References Cited

U.S. PATENT DOCUMENTS

2017/0096073 A1*    4/2017    Mardall et al. ......... B60L 11/18
2017/0297431 A1    10/2017    Epstein et al.
2020/0338998 A1*    10/2020    Wainwright .......... B60L 53/302

FOREIGN PATENT DOCUMENTS

JP    H07-105988 A    4/1995
JP    2017-004677 A    1/2017
(Continued)

OTHER PUBLICATIONS

Japanese Office Action in JPA No. 2020-172074 issued Apr. 9, 2024 with English translation thereof.
(Continued)

*Primary Examiner* — Haroon S. Sheikh
*Assistant Examiner* — Kan Luo
(74) *Attorney, Agent, or Firm* — MCGINN I.P. LAW GROUP, PLLC (57) ABSTRACT

A vehicle battery cooling apparatus configured to cool a battery mounted on a vehicle includes a first fluid circuit and a second fluid circuit. In the first fluid circuit, a first cooling fluid to cool the battery is to be circulated while the vehicle is traveling. In a second fluid circuit, a second cooling fluid to cool the battery is to be circulated while the battery is being charged. The first fluid circuit and the second fluid circuit are independent from each other.

10 Claims, 6 Drawing Sheets

(51) Int. Cl.
*H01M 10/613* (2014.01)
*H01M 10/625* (2014.01)
*H01M 10/63* (2014.01)
*H01M 10/6568* (2014.01)
*H01M 10/663* (2014.01)

(56) References Cited

FOREIGN PATENT DOCUMENTS

| JP | 2019-075248 A | 5/2019 |
| JP | 2020-054048 A | 4/2020 |

OTHER PUBLICATIONS

Japanese Office Action, dated Aug. 6, 2024 in Japanese Application No. 2020-172074 and English Translation therefor.

* cited by examiner

VEHICLE BATTERY COOLING APPARATUS

CROSS-REFERENCE TO RELATED APPLICATIONS

The present application claims priority from Japanese Patent Application No. 2020-172074 filed on Oct. 12, 2020, the entire contents of which are hereby incorporated by reference.

BACKGROUND

The disclosure relates to vehicle battery cooling apparatus and, in particular, relates to a vehicle battery cooling apparatus including a plurality of fluid circuits to cool a battery.

An electric vehicle includes an on-board battery to accumulate traveling power. The battery generates heat by discharging electricity during traveling and also generates heat while on charge. Therefore, temperature of the battery is controlled to be within a predetermined temperature range. That is, the temperature of the battery is increased not to be a lower limit or less and is decreased not to be an upper limit or higher. Thus, predetermined or higher discharging and charging efficiency is secured.

Japanese Unexamined Patent Application Publication (JP-A) No. H7-105988 discloses a technique of cooling a battery on charge by coupling an external charger to a battery cooling circuit disposed in a vehicle so as to introduce and circulate cooling water in the battery cooling circuit at the same time as charging.

SUMMARY

An aspect of the disclosure provides a vehicle battery cooling apparatus configured to cool a battery mounted on a vehicle. The vehicle battery cooling apparatus includes a first fluid circuit and a second fluid circuit. In the first fluid circuit, a first cooling fluid to cool the battery is to be circulated while the vehicle is traveling. In a second fluid circuit, a second cooling fluid to cool the battery is to be circulated while the battery is being charged. The first fluid circuit and the second fluid circuit are independent from each other.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIGS. 3A to 3C illustrate the vehicle battery cooling apparatus according to the embodiment of the disclosure.

FIGS. 4A and 4B illustrate the vehicle battery cooling apparatus according to the embodiment of the disclosure.

DETAILED DESCRIPTION

As to a battery cooling apparatus disclosed in JP-A No. H7-105988, there is still room for improvement in view of efficiently cooling the battery during traveling and charging.

For example, in JP-A No. H7-105988, although cooling water is supplied from an outside of the vehicle to cool the on-board battery, the on-board battery is not cooled by a combination of an on-board cooling device and an off-board cooling device. Consequently, with the technique disclosed in JP-A No. H7-105988, it is not easy to maintain temperature of the battery within a predetermined range while the vehicle is both traveling and being charged.

It is desirable to provide a vehicle battery cooling apparatus that includes individual fluid circuits to cool a battery while a vehicle is both traveling and being charged.

Hereinafter, a vehicle battery cooling apparatus 16 according to an embodiment of the disclosure will be detailed with reference to the accompanying drawings. In the following description, "front", "rear", "upper", "lower", "left", and "right" will be used to indicate directions, and "left" and "right" will refer to the left and right when a vehicle 10 is viewed from a rear side. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
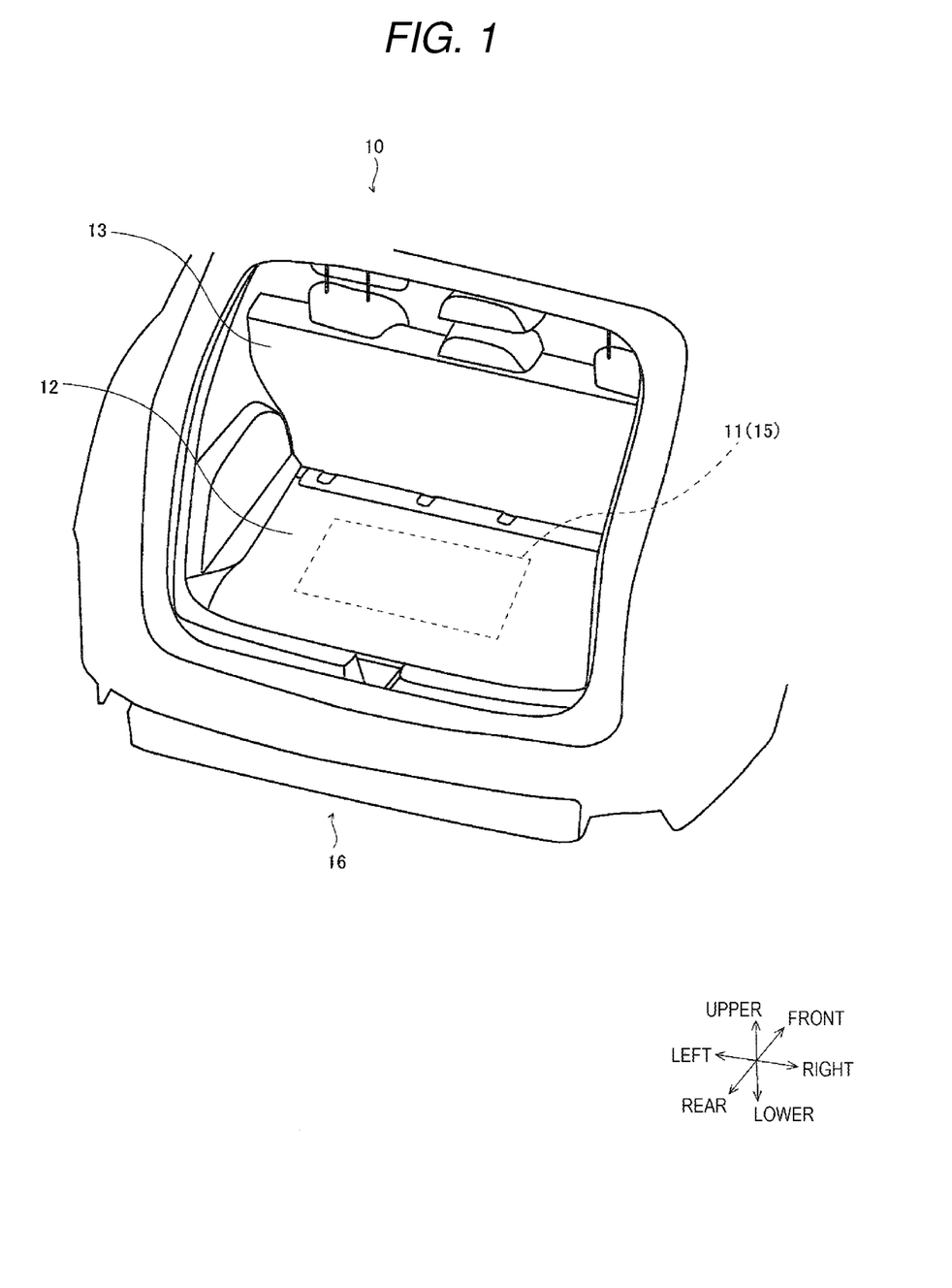
FIG. 1 is a perspective view of a vehicle including a vehicle battery cooling apparatus according to an embodiment of the disclosure.

FIG. 1 is a perspective view of the vehicle 10 including the vehicle battery cooling apparatus 16.

The vehicle 10, such as an automobile and a train, includes an on-board battery 15 to supply power to a motor and various other electrical components. The vehicle 10 is, for example, an electrical vehicle (EV), a hybrid electrical vehicle (HEV), or a plug-in hybrid electrical vehicle (PHEV).

In FIG. 1, for convenience of description, a rear gate to cover a rear end of a vehicle body of the vehicle 10 is omitted. Rear seats 13 are disposed in a rear portion of a vehicle cabin of the vehicle 10, and a rear floor 12 is disposed on a rear side of the rear seats 13. Although not illustrated in this drawing, the battery 15, described later, is disposed in a storage space 11 below the rear floor 12. As described later, in the vicinity of the battery 15, the vehicle battery cooling apparatus 16 to cool the battery 15 is disposed.

It is noted that the battery 15 and the vehicle battery cooling apparatus 16 are not limited to installation below the rear floor 12 but may be disposed, for example, below a front floor (not illustrated) where a driver's seat or a front passenger's seat are disposed.

Figure 2:
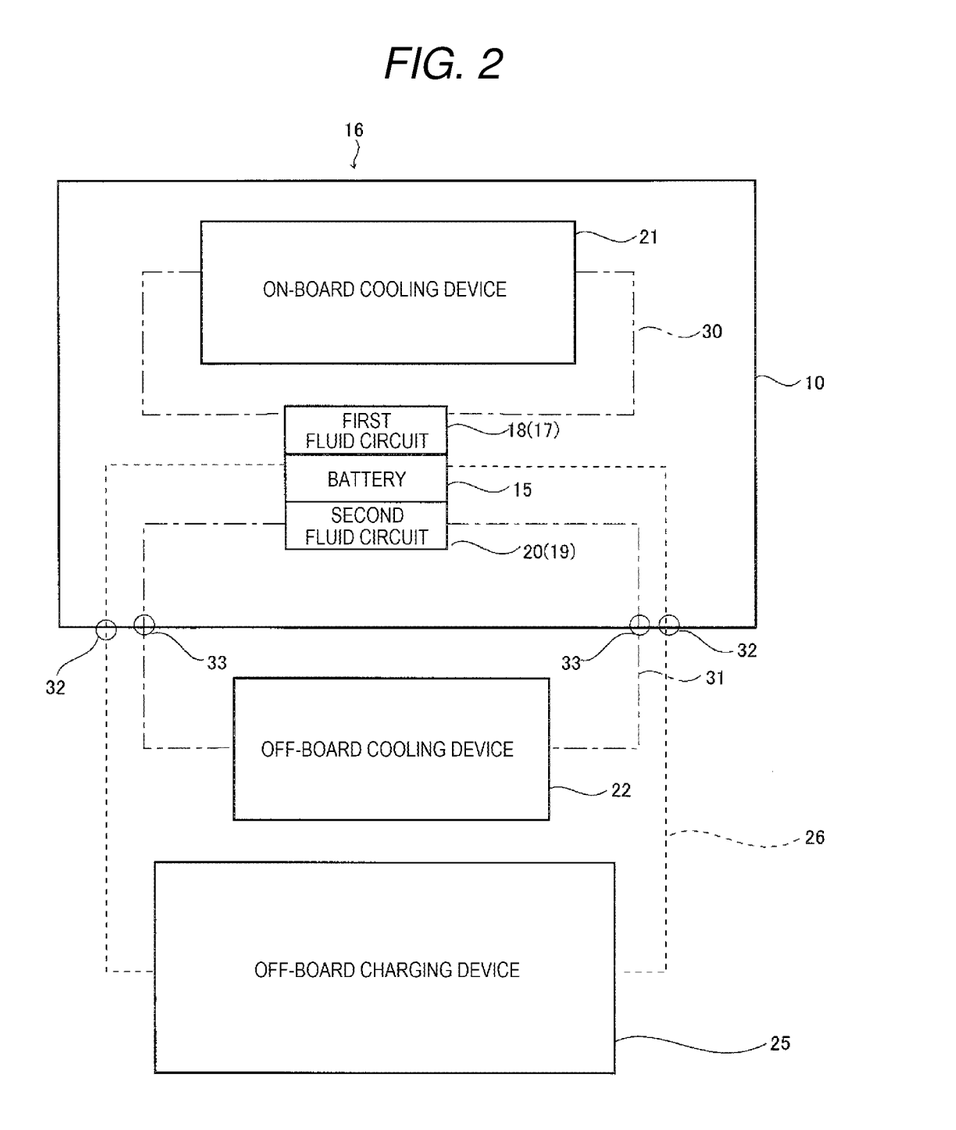
FIG. 2 is a schematic diagram illustrating a configuration of the vehicle battery cooling apparatus according to the embodiment of the disclosure.

FIG. 2 is a schematic diagram illustrating a configuration of the vehicle battery cooling apparatus 16.

The vehicle battery cooling apparatus 16 cools the battery 15 mounted on the vehicle 10 and includes a first fluid circuit 18 and a second fluid circuit 20. In the first fluid circuit 18, a first cooling fluid 17 is circulated to cool the battery 15 discharging electricity while the vehicle 10 is traveling. Meanwhile, in the second fluid circuit 20, a second cooling fluid 19 is circulated to cool the battery 15 while the vehicle 10 is stopped and the battery 15 is being charged. The first fluid circuit 18 and the second fluid circuit 20 are independent from each other. Such a vehicle battery cooling apparatus 16 makes it possible to cool the battery 15 efficiently during both traveling and being charged, as described later. Moreover, the second cooling fluid 19 to be circulate in the second fluid circuit 20 is not mounted on the vehicle 10, so that the vehicle 10 can be reduced in weight.

The first fluid circuit 18 is disposed at such a position that heat exchange with the battery 15 is possible. The first fluid circuit 18 is coupled to an on-board cooling device 21 via a first fluid route 30.

As the on-board cooling device 21, for example, an evaporator of a freezing cycle to cool the vehicle cabin, or a radiator may be employed.

The first fluid route 30 is a pipe line to couple the on-board cooling device 21 and the first fluid circuit 18 to each other. As the first cooling fluid 17, a fluid circulatable between the first fluid circuit 18 and the on-board cooling device 21 may be generally employed. For example, a fluid, such as water, a coolant gas, or other gas, may be employed. A pump, not illustrated, to circulate the first cooling fluid 17 is disposed in an intermediate portion of the first fluid route 30. When the battery 15 is cooled with the first fluid circuit 18, the first cooling fluid 17 is circulated among the first fluid circuit 18, the first fluid route 30, and the on-board cooling device 21 while the first cooling fluid 17 that has been increased in temperature by absorbing heat from the battery 15 is cooled by the on-board cooling device 21.

The second fluid circuit 20 is a cooling circuit provided as a component separate from the first fluid circuit 18. The second fluid circuit 20 is disposed at such a position that heat exchange with the battery 15 is possible. The second fluid circuit 20 is coupled to an off-board cooling device 22 via a second fluid route 31.

The off-board cooling device 22 is disposed outside the vehicle 10 and is a cooling device integral to a stationary off-board charging device 25, for example. As the off-board cooling device 22, for example, an evaporator of a freezing cycle, or a radiator may be employed.

The second fluid route 31 is a pipe line to couple the off-board cooling device 22 and the second fluid circuit 20 to each other. As the second cooling fluid 19, in a manner similar to the first cooling fluid 17, various kinds of fluid may be generally employed. For example, a fluid, such as water, a coolant gas, or other gas, may be employed. A pump, not illustrated, to circulate the second cooling fluid 19 is disposed in an intermediate portion of the second fluid route 31. When the battery 15 is cooled with the second fluid circuit 20, the second cooling fluid 19 is circulated among the second fluid circuit 20, the second fluid route 31, and the off-board cooling device 22 while the second cooling fluid 19 that has been increased in temperature by absorbing heat from the battery 15 is cooled by the off-board cooling device 22.

Fluid couplers 33 are disposed in intermediate portions of the second fluid route 31. Each of the fluid couplers 33 is an attachment port disposed on the vehicle 10 and is a component with which an occupant or operator couples a vehicle 10 side portion of the second fluid route 31 and an off-board portion of the second fluid route 31 to each other. In one example, as the fluid couplers 33, attachment components may be employed. While the vehicle 10 is traveling, the second fluid route 31 is not coupled at the fluid couplers 33. When the vehicle 10 is charged, the vehicle 10 side portions and the off-board portions of the second fluid route 31 are coupled to each other at the fluid couplers 33.

The off-board charging device 25 is a fixed charging device disposed outside the vehicle 10 and is coupled to the battery 15 via a current supply circuit 26. Attachment current couplers 32 are disposed in the current supply circuit 26. When the vehicle 10 is traveling, the current supply circuit 26 is not coupled at the current couplers 32. When the battery 15 is charged, the current supply circuit 26 is coupled at the current couplers 32. In this case, each of the current couplers 32 of the current supply circuit 26 and each of the fluid couplers 33 of the second fluid route 31 may be provided as an integral attachment device. With this configuration, both coupling and decoupling of the current coupler 32 and the fluid coupler 33 can be performed at once.

Figure 3A:
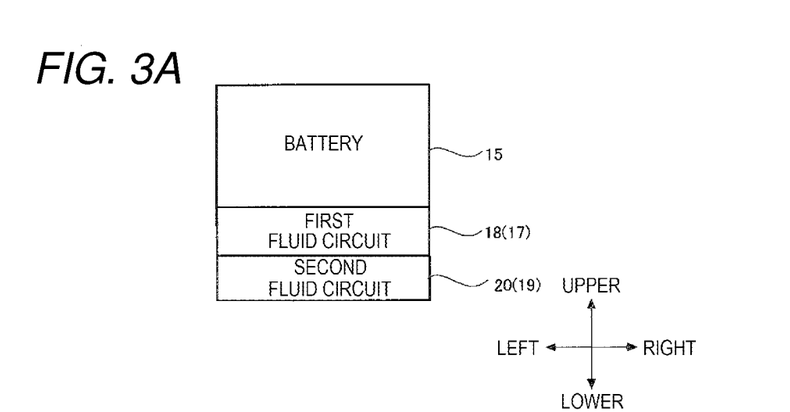
FIG. 3A is a block diagram illustrating a configuration of a battery and fluid circuits.
Figure 3B:
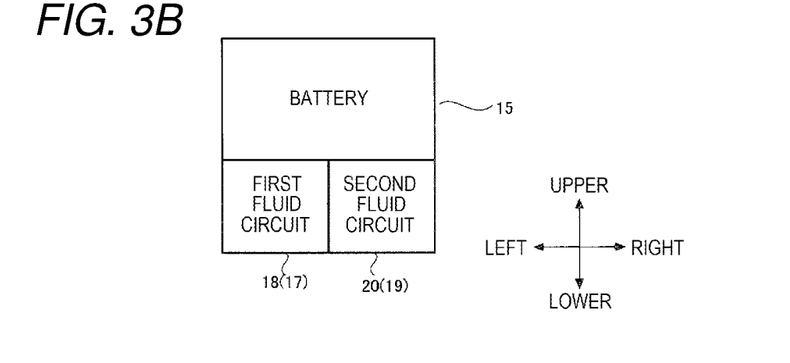
FIG. 3B is a block diagram illustrating another configuration of the battery and the fluid circuits.
Figure 3C:
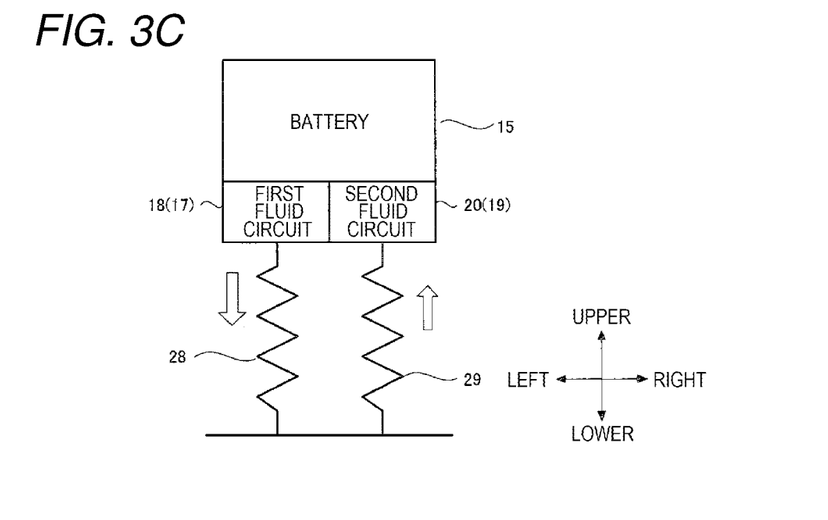
FIG. 3C is a schematic diagram illustrating a configuration of urging members.

FIG. 3A is a block diagram illustrating a configuration of the battery 15 and the fluid circuits. FIG. 3B is a block diagram illustrating another configuration of the battery 15 and the fluid circuits. FIG. 3C is a schematic diagram illustrating a configuration of urging members.

Referring to FIG. 3A, the first fluid circuit 18 is disposed immediately beneath the battery 15, and the second fluid circuit 20 is disposed immediately beneath the first fluid circuit 18. With this configuration, when the vehicle 10 is traveling, the battery 15 can be cooled by the first cooling fluid 17 flowing in the first fluid circuit 18. During charging, the battery 15 can be cooled by the second cooling fluid 19 flowing in the second fluid circuit 20 and the first cooling fluid 17 that exists in the first fluid circuit 18.

Referring to FIG. 3B, the first fluid circuit 18 and the second fluid circuit 20 are disposed beneath the battery 15. In one example, the first fluid circuit 18 is disposed immediately beneath a left side of the battery 15, and the second fluid circuit 20 is disposed immediately beneath a right side of the battery 15. With this configuration, both the first fluid circuit 18 and the second fluid circuit 20 are in so close contact with the battery 15 that the battery can be cooled more efficiently with the first fluid circuit 18 and the second fluid circuit 20.

Referring to FIG. 3C, the first fluid circuit 18 and the second fluid circuit 20 are disposed immediately beneath the battery 15. Moreover, the first fluid circuit 18 is urged toward the battery 15 by a first urging member 28, and the second fluid circuit 20 is urged toward the battery 15 by a second urging member 29. As the first urging member 28 and the second urging member 29, springs or air pistons may be employed.

When the battery 15 is cooled during traveling, the first fluid circuit 18 is pressed against the battery 15 by the first urging member 28 so that heat exchange between the battery 15 and the first cooling fluid 17 in the first fluid circuit 18 can be promoted to efficiently cool the battery 15. At this time, an urging force by the second urging member 29 may be reduced to make the second fluid circuit 20 apart from the battery 15. This configuration can prevent unintentional heat exchange between the second cooling fluid 19 in the second fluid circuit 20 and the battery 15 so as to cool the battery 15 during traveling more efficiently.

When the battery 15 is cooled during charging, the second fluid circuit 20 is pressed against the battery 15 by the second urging member 29 so that heat exchange between the battery 15 and the second cooling fluid 19 in the second fluid circuit 20 can be promoted, thereby efficiently cooling the battery 15. At this time, an urging force by the first urging member 28 may be reduced to make the first fluid circuit 18 apart from the battery 15. This configuration can prevent unintentional heat exchange between the first cooling fluid 17 in the first fluid circuit 18 and the battery 15 so as to cool the battery 15 during charging more efficiently.

Figure 4A:
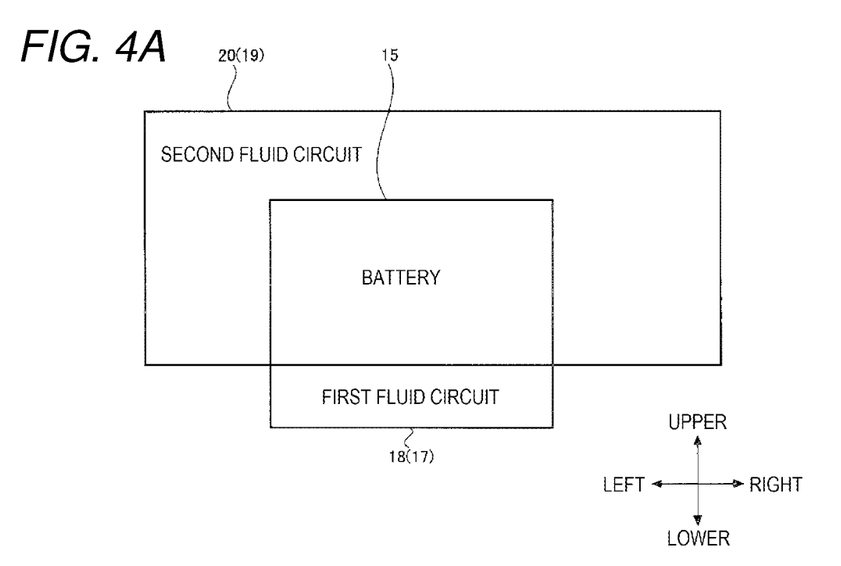
FIG. 4A is a schematic cross-sectional view illustrating a configuration of a first fluid circuit and a second fluid circuit.
Figure 4B:
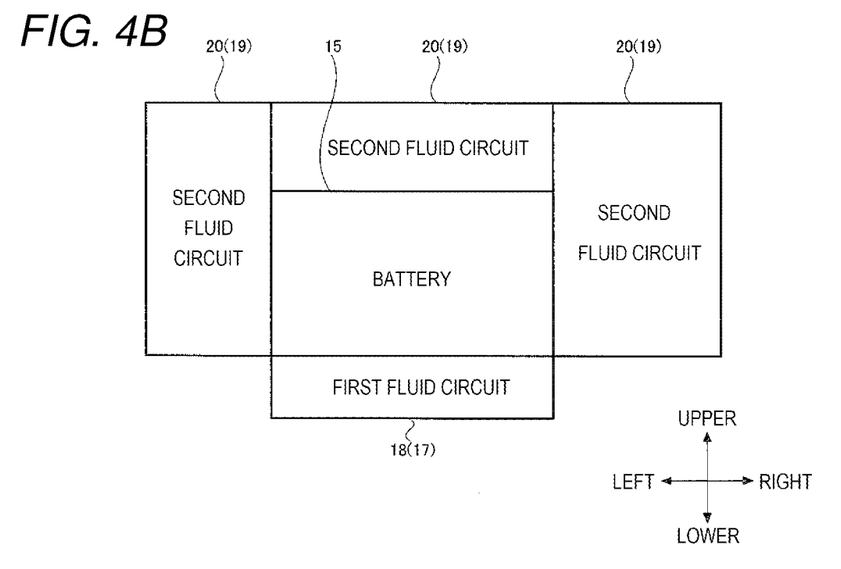
FIG. 4B is a schematic cross-sectional view illustrating another configuration of the first fluid circuit and the second fluid circuit.

FIG. 4A is a schematic cross-sectional view illustrating a configuration of the first fluid circuit 18 and the second fluid circuit 20. FIG. 4B is a schematic cross-sectional view illustrating another configuration of the first fluid circuit 18 and the second fluid circuit 20.

Referring to FIG. 4A, in this case, an upper surface and side surfaces of the battery 15 are covered with the second fluid circuit 20, and a lower surface of the battery 15 is covered with the first fluid circuit 18. During traveling, the battery 15 is cooled by running the first cooling fluid 17 in the first fluid circuit 18. Moreover, the second cooling fluid 19 is drained from the second fluid circuit 20, and an inside of the second fluid circuit 20 is reduced in pressure or evacuated as necessary, so that the battery 15 can be prevented from receiving heat from surroundings, thus improving temperature control efficiency. During charging, the upper surface and the side surfaces of the battery 15 can be cooled efficiently by the second cooling fluid 19 circulating in the second fluid circuit 20. Furthermore, during charging, an inside of the first fluid circuit 18 is reduced in pressure or evacuated so that the battery 15 can be prevented from receiving heat from the lower surface, thus improving temperature control efficiency.

Referring to FIG. 4B, the lower surface of the battery 15 is covered with the first fluid circuit 18. The upper surface and the side surfaces of the battery 15 are covered with the second fluid circuit 20. In one example, the upper surface of the battery 15, the left side surface of the battery 15, and the right side surface of the battery 15 are covered with the individual second fluid circuits 20.

This configuration makes it possible to change a flow rate of the second cooling fluid 19 circulating in each of the second fluid circuits 20 in accordance with a partial amount of heat generated by the battery 15. In one example, while the battery 15 is being charged or discharging electricity, terminals disposed on an upper side of the battery 15 generate a large amount of heat. That is, while the battery 15 is being charged or discharging electricity, an amount of heat generated from the upper side of the battery 15 is larger than an amount of heat generated from lateral sides of the battery 15. In view of this, a flow rate of the second cooling fluid 19 circulating in the second fluid circuit 20 formed on the upper side of the battery 15 is made higher than a flow rate of the second cooling fluid 19 circulating in the second fluid circuits 20 formed on both of the left and right sides of the battery 15. This configuration can prevent the upper side of the battery 15 from having a high temperature, thereby reducing a decrease in the charging and discharging efficiency of the battery 15.

Figure 5:
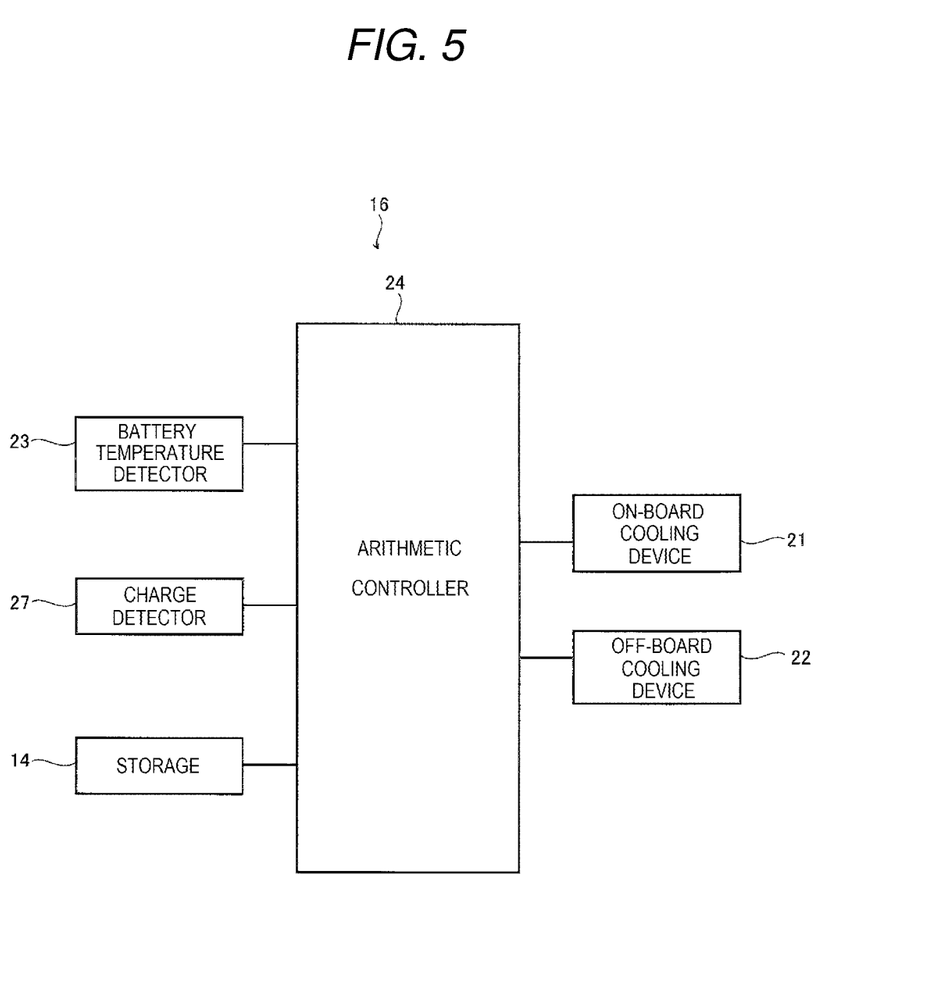
FIG. 5 is a block diagram illustrating a coupling configuration of the vehicle battery cooling apparatus according to the embodiment of the disclosure.

FIG. 5 is a block diagram illustrating a coupling configuration of the vehicle battery cooling apparatus 16. The vehicle battery cooling apparatus 16 includes an arithmetic controller 24, a battery temperature detector 23, a charge detector 27, a storage 14, the on-board cooling device 21, and the off-board cooling device 22.

The arithmetic controller 24 is, for example, a CPU, in which input-side terminals are coupled to the battery temperature detector 23, the charge detector 27, and the storage 14, and output-side terminals are coupled to the on-board cooling device 21 and the off-board cooling device 22. Based on information input from the battery temperature detector 23, the charge detector 27, and the storage 14, the arithmetic controller 24 controls operation of the on-board cooling device 21 and the off-board cooling device 22.

The battery temperature detector 23 detects a temperature of the battery 15 and inputs a result of the detection to the arithmetic controller 24.

The charge detector 27 detects a situation of the battery 15 being charged and inputs a result of the detection to the arithmetic controller 24.

The storage 14 is a RAM or a ROM, and stores programs and parameters, for example, to operate the vehicle battery cooling apparatus 16.

As described above, the on-board cooling device 21 is mounted on the vehicle 10 and cools the battery 15 while the vehicle 10 is traveling.

As described above, the off-board cooling device 22 is disposed at a location outside the vehicle 10 such as a charging station, and cools the battery 15 while the vehicle 10 is being charged.

Figure 6:
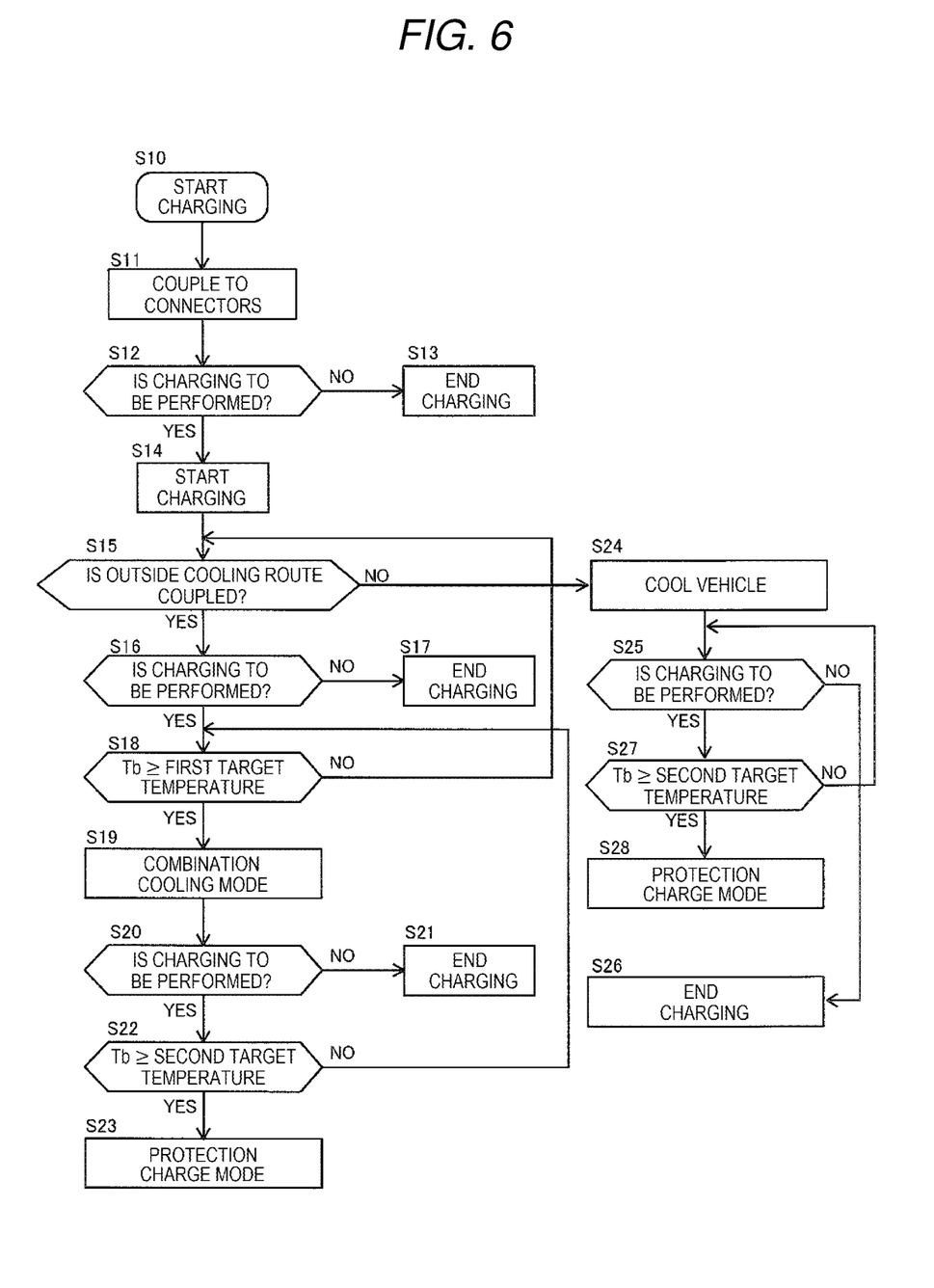
FIG. 6 is a flowchart of operation of the vehicle battery cooling apparatus according to the embodiment of the disclosure.

FIG. 6 is a flowchart of the operation of the vehicle battery cooling apparatus 16. Based on FIG. 6, referring back to the preceding drawings as well, the operation of the vehicle battery cooling apparatus 16 will now be described.

At step S10, the vehicle 10 is stopped, and charging of the battery 15 is started.

At step S11, the occupant or operator performs coupling to connectors. In one example, referring to FIG. 2, the current supply circuit 26 is coupled at the current couplers 32 so as to couple the off-board charging device 25 and the battery 15 to each other via the current supply circuit 26. The second fluid route 31 is coupled at the fluid couplers 33 so as to couple the second fluid circuit 20 and the off-board cooling device 22 to each other via the second fluid route 31.

At step S12, the arithmetic controller 24 determines whether charging is to be performed. That is, based on a voltage, for example, of the battery 15 mounted on the vehicle 10, the arithmetic controller 24 determines whether charging is to be performed.

In the case of YES at step S12, the arithmetic controller 24 proceeds to step S14 to charge the battery 15.

In the case of NO at step S12, the arithmetic controller 24 proceeds to step S13.

At step S13, the arithmetic controller 24 ends charging operation of the battery 15. In one example, the occupant, for example, decouples the above-mentioned connectors so as to decouple the current supply circuit 26 at the current couplers 32 and decouple the second fluid route 31 at the fluid couplers 33.

At step S14, the arithmetic controller 24 starts charging. That is, based on an instruction from the arithmetic controller 24, power is supplied from the off-board charging device 25 to the battery 15 via the current supply circuit 26.

At step S15, the arithmetic controller 24 reconfirms a coupling state of the fluid couplers 33.

In the case of YES at step S15, that is, when the fluid couplers 33 are coupled, the arithmetic controller 24 proceeds to step S16. That is, the arithmetic controller 24 implements an off-board cooling mode of cooling the battery 15 using the off-board cooling device 22 disposed outside the vehicle 10.

In the case of NO at step S15, that is, when the fluid couplers 33 are decoupled, the arithmetic controller 24 proceeds to step S24.

At step S16, using the charge detector 27, the arithmetic controller 24 determines whether the battery 15 is to be charged.

In the case of YES at step S16, the arithmetic controller 24 proceeds to step S18 to charge the battery 15.

In the case of NO at step S16, the arithmetic controller 24 proceeds to step S17.

At step S17, the arithmetic controller 24 ends the charging operation of the battery 15. Also, the arithmetic controller 24 stops the off-board cooling device 22 so as to end cooling via the second fluid circuit 20.

At step S18, using the battery temperature detector 23, the arithmetic controller 24 determines whether a measurement temperature Tb of the battery 15 is a first target temperature or higher. At this step, the first target temperature is 30° C., for example.

In the case of YES at step S18, the arithmetic controller 24 determines that the off-board cooling device 22 does not have a sufficient cooling capacity, and proceeds to step S19.

In the case of NO at step S18, the arithmetic controller 24 determines that the off-board cooling device 22 has a sufficient cooling capacity, and proceeds to step S15. That is, the arithmetic controller 24 continues to cool the battery 15 using the off-board cooling device 22.

At step S19, the arithmetic controller 24 implements a combination cooling mode. That is, while the second cooling fluid 19 is circulated between the off-board cooling device 22 and the second fluid circuit 20, the battery 15 is cooled. Moreover, the on-board cooling device 21 is operated to circulate the first cooling fluid 17 between the first fluid circuit 18 and the on-board cooling device 21 so that the battery 15 is further cooled.

At step S20, using the charge detector 27, the arithmetic controller 24 determines whether the battery 15 is to be charged.

In the case of YES at step S20, the arithmetic controller 24 proceeds to step S22 to charge the battery 15.

In the case of NO at step S20, the arithmetic controller 24 proceeds to step S21.

At step S21, the arithmetic controller 24 ends charging the battery 15. Also, the arithmetic controller 24 stops the off-board charging device 25 and the on-board cooling device 21 so as to end cooling the battery 15.

At step S22, the arithmetic controller 24 determines whether the measurement temperature Tb of the battery 15 that has been measured by the battery temperature detector 23 is a second target temperature or higher. At this step, the second target temperature is higher than the above-mentioned first target temperature. The second target temperature is 50° C., for example.

In the case of YES at step S22, that is, when the measurement temperature Tb of the battery 15 is the second target temperature or higher, the arithmetic controller 24 determines that the off-board cooling device 22 and the on-board cooling device 21 do not have a sufficient cooling capacity, and proceeds to step S23.

In the case of NO at step S22, that is, unless the measurement temperature Tb of the battery 15 is the second target temperature or higher, the arithmetic controller 24 determines that combination cooling by the on-board cooling device 21 and the off-board cooling device 22 has a sufficient cooling capacity, and proceeds to step S18 to continue to cool the battery 15 using a combination of the off-board cooling device 22 and the on-board cooling device 21.

At step S23, the arithmetic controller 24 shifts to a protection charge mode. That is, because the cooling capacity provided by the combination of the off-board cooling device 22 and the on-board cooling device 21 is not sufficient, an amount of power supplied from the off-board charging device 25 to the battery 15 is reduced to decrease the temperature of the battery 15.

At step S24, the arithmetic controller 24 implements a vehicle cooling mode of cooling the battery 15 using the on-board cooling device 21 mounted on the vehicle 10.

At step S25, using the charge detector 27, the arithmetic controller 24 determines whether the battery 15 is to be charged.

In the case of YES at step S25, that is, when the battery 15 is to be charged, the arithmetic controller 24 proceeds to step S27 to charge the battery 15.

In the case of NO at step S25, that is, unless the battery 15 is to be charged, the arithmetic controller 24 proceeds to step S26.

At step S26, the arithmetic controller 24 ends the charging operation.

At step S27, while charging the battery 15, the arithmetic controller 24 determines whether the measurement temperature Tb of the battery 15 that has been measured by the battery temperature detector 23 is the above-mentioned second target temperature or higher.

In the case of YES at step S27, that is, when the measurement temperature Tb of the battery 15 is the second target temperature or higher, the arithmetic controller 24 determines that the on-board cooling device 21 does not have a sufficient cooling capacity, and proceeds to step S28.

In the case of NO at step S27, that is, unless the measurement temperature Tb of the battery 15 is the second target temperature or higher, the arithmetic controller 24 returns to step S25.

At step S28, the arithmetic controller 24 shifts to the protection charge mode. That is, because the cooling capacity of the on-board cooling device 21 is not sufficient, the amount of power supplied from the off-board charging device 25 to the battery 15 is reduced to decrease the temperature of the battery 15.

The operation of the vehicle battery cooling apparatus 16 has been described so far.

The above-described embodiment can produce the following primary effects.

According to the embodiment, because the first fluid circuit 18 and the second fluid circuit 20 are independent from each other, the battery 15 can be cooled by switching between use of the first fluid circuit 18 and use of the second fluid circuit 20 in accordance with a situation of the vehicle 10.

Since the first fluid circuit 18 is interposed between the battery 15 and the second fluid circuit 20, a space occupied by the fluid circuits can be reduced.

Each of the first fluid circuit 18 and the second fluid circuit 20 is disposed so close to the battery 15 that the battery 15 can be cooled more directly by the first fluid circuit 18 and the second fluid circuit 20.

Since the second cooling fluid 19 circulating in the second fluid circuit 20 is cooled by the cooling device disposed outside the vehicle 10, no cooling device to cool the second fluid circuit 20 mounted on the vehicle 10 is used, thereby reducing the vehicle 10 in weight.

Furthermore, when the battery 15 is charged, the battery 15 can be cooled using the first cooling fluid 17 and the second cooling fluid 19 in accordance with a detection temperature of the battery 15 so as to cool the battery 15 more efficiently.

Although the embodiment of the disclosure has been described heretofore, the disclosure is not limited to this embodiment but may be modified without departing from the subject matter of the disclosure. Moreover, the above-described modes may be combined with one another.

For example, referring to FIG. 3A, the first fluid circuit 18 may be disposed beneath the second fluid circuit 20.

The invention claimed is:

1. A vehicle battery cooling apparatus configured to cool a battery mounted on a vehicle, the vehicle battery cooling apparatus comprising:
    a first fluid circuit where a first cooling fluid to cool the battery is to be circulated while the vehicle is traveling; and
    a second fluid circuit where a second cooling fluid to cool the battery is to be circulated while the battery is being charged,
    wherein the first fluid circuit and the second fluid circuit are independent and separate from each other, and each of the first fluid circuit and the second fluid circuit cool the battery independently and separately from each other,
    wherein the first fluid circuit covers a lower surface of the battery, and
    wherein the second fluid circuit covers an upper surface and side surfaces of the battery.

2. The vehicle battery cooling apparatus according to claim 1,
    wherein the first cooling fluid circulating in the first fluid circuit is cooled by an on-board cooling device disposed on the vehicle, and
    wherein the second cooling fluid circulating in the second fluid circuit is cooled by an off-board cooling device disposed outside the vehicle.

3. The vehicle battery cooling apparatus according to claim 1, further comprising:
    a battery temperature detector configured to detect a temperature of the battery; and
    an arithmetic controller configured to
        when a detection temperature of the battery detected by the battery temperature detector is lower than a target temperature while the battery is being charged, cause only the second cooling fluid from between the first cooling fluid and the second cooling fluid to be circulated to cool the battery, and
        when the detection temperature of the battery detected by the battery temperature detector is higher than the target temperature while the battery is being charged, cause the second cooling fluid circulating in the second fluid circuit and the first cooling fluid circulating in the first fluid circuit to cool the battery.

4. The vehicle battery cooling apparatus according to claim 2, further comprising:
    a battery temperature detector configured to detect a temperature of the battery; and
    an arithmetic controller configured to
        when a detection temperature of the battery detected by the battery temperature detector is lower than a target temperature while the battery is being charged, cause only the second cooling fluid from between the first cooling fluid and the second cooling fluid to be circulated to cool the battery, and
        when the detection temperature of the battery detected by the battery temperature detector is higher than the target temperature while the battery is being charged, cause the second cooling fluid circulating in the second fluid circuit and the first cooling fluid circulating in the first fluid circuit to cool the battery.

5. The vehicle battery cooling apparatus according to claim 1, wherein the first fluid circuit and the second fluid circuit are on-board the vehicle.

6. The vehicle comprising the vehicle battery cooling apparatus according to claim 1.

7. The vehicle battery cooling apparatus according to claim 1, wherein an inside of the first fluid circuit is reduced in pressure or evacuated while the battery is being charged.

8. The vehicle battery cooling apparatus according to claim 1,
    wherein an inside of the second fluid circuit is reduced in pressure or evacuated while the vehicle is traveling.

9. The vehicle battery cooling apparatus according to claim 7, wherein an inside of the second fluid circuit is reduced in pressure or evacuated while the vehicle is traveling.

10. The vehicle battery cooling apparatus according to claim 1, wherein a flow rate of the second cooling fluid in a first portion of the second fluid circuit is higher than a flow rate of the second cooling fluid in a second portion of the second fluid circuit, the first portion covering upper surface of the battery, the second portion covering the side surfaces of the battery.

* * * * *